(12) United States Patent
Begley

(10) Patent No.: US 6,385,161 B1
(45) Date of Patent: May 7, 2002

(54) SECURING MECHANISM AND METHOD FOR AN OPTICAL DISC DRIVE

(75) Inventor: Paul V. Begley, Loveland, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/353,174

(22) Filed: Jul. 14, 1999

(51) Int. Cl.$^7$ .............................................. G11B 17/30
(52) U.S. Cl. ..................................................... 369/219
(58) Field of Search ................................. 369/219, 221, 369/223, 79, 215, 244, 71, 72, 75.1, 75.2, 77.2

(56) References Cited

U.S. PATENT DOCUMENTS

| | | | | |
|---|---|---|---|---|
| 5,025,437 A | * | 6/1991 | Yamashita et al. ............. 369/79 |
| 5,111,350 A | | 5/1992 | Carey et al. ............. 360/99.06 |
| 5,245,601 A | * | 9/1993 | Hake ........................... 369/72 |
| 5,278,819 A | * | 1/1994 | Shimegi et al. ............. 369/215 |
| 5,297,122 A | | 3/1994 | Christie ....................... 369/13 |
| 5,444,690 A | * | 8/1995 | Childers, III et al. ........ 369/263 |
| 5,490,124 A | * | 2/1996 | Oliver et al. ................. 369/13 |
| 5,615,196 A | * | 3/1997 | Kato ............................. 369/71 |
| 5,946,291 A | * | 8/1999 | d'Arc ........................ 369/292 |
| 5,995,467 A | * | 11/1999 | Ohyama et al. .............. 369/71 |
| 6,185,180 B1 | * | 2/2001 | Morishita ................... 369/244 |

* cited by examiner

*Primary Examiner*—David Hudspeth
*Assistant Examiner*—Angel Castro

(57) ABSTRACT

An optical disc drive having a cover member attached thereto is disclosed. The cover member serves to protect optical components located in the optical disc drive from shock, vibration, and contamination. The cover member is affixed to the optical disc drive in the proximity of the optical components. The optical disc drive moves the optical components under the cover member when the optical components are not required for the operation of the optical disc drive. The optical components are, thus, held in a secure position by the cover member, which protects the optical components from shock and vibration. The cover member provides additional protection for the optical components by removing the optical components from the reach of a user. In addition, the cover member blocks any harmful light emissions by the optical components from contacting the user.

16 Claims, 3 Drawing Sheets

SECURING MECHANISM AND METHOD FOR AN OPTICAL DISC DRIVE

TECHNICAL FIELD OF THE INVENTION

The present invention relates to optical disc drives and, more particularly, to a mechanism and method for securing and covering the optical pickup unit of an optical disc drive when the optical disc drive is not in use.

BACKGROUND OF THE INVENTION

Optical disc drives are devices that use light to translate information stored on an optical disc to a machine-readable format, e.g., binary data. Examples of optical disc drives are known in the art as compact disc drives (often referred to simply as CDs) and digital versatile disc drives (often referred to simply as DVDs). Some optical disc drives have the additional capability of being able to write data onto an optical disc by the use of a light source, e.g., a laser. Optical disc drives are being used in various applications including music and video playing and recording devices and computer data storage devices. As these applications become more portable, the optical disc drives also need to become more portable. For example, they must be compact and able to withstand the shock and vibration to which portable applications are commonly subject.

The optical disc is a round, flat device similar to a record. Digital data is stored in spiral tracks on the optical disc in much the same way analog audio information is stored in a spiral groove on a record. The data stored on an optical disc, however, is much more compact than the audio information stored on a record. For example, the radial distance between tracks on an optical disc is typically approximately 1.6 microns for a compact disc and less for a digital versatile disc. The data on the optical disc consists of a plurality of optical transitions that are detected or "read" by the optical disc drive as the optical disc spins. The optical disc may spin at varying speeds of up to 4000 rpm as data is being read from or written to the optical disc.

A schematic diagram of a side view of a conventional optical disc drive 100 is illustrated in FIG. 1. The optical disc drive 100 is illustrated with an optical disc 110 attached thereto wherein data is stored on an optical surface 112 of the optical disc 110. The optical disc drive 100 has three basic components, a drive motor 120, an optical pickup unit 130, and an optical mechanical assembly 140. The drive motor 120 serves to spin the optical disc 110 at predetermined rates that typically vary from several hundred to several thousand rpm. The optical pickup unit 130 serves to read and write data from and to the optical surface 112 of the optical disc 110. The optical mechanical assembly 140 serves to move the optical pickup unit 130 in a radial direction 152 relative to the optical disc 110 to predetermined locations relative to the optical disc 110.

The optical pickup unit 130 typically has a laser, not shown, to illuminate the optical surface 112, an objective lens 132 to focus the laser, and a photodetector, not shown, to translate light to machine-readable data. Other optical components may be located within the optical pickup unit 130 to direct light between the photodetector and the objective lens 132. Mechanical components may be located in the optical pickup unit 130 and may serve to support the objective lens 132 and to move the objective lens 132 relative to the optical pickup unit 130.

The optical pickup unit 130 emits incident light that is directed through the objective lens 132 and onto the optical surface 112 of the optical disc 110. The optical pickup unit 130 may, as an example, output approximately 20 milliwatts of coherent light having a wavelength of approximately 790 nanometers. Light is reflected from the optical surface 112 of the optical disc 110 through the objective lens 132 and back to the optical pickup unit 130. The light reflected from the optical surface 112 of the optical disc 110 varies in intensity wherein the variations are caused by light reflecting from the optical transitions on the optical surface 112 as the optical disc 110 spins. These variations in intensity are representative of the data stored on the optical surface 112.

As the optical disc 110 spins, the mechanical components in the optical pickup unit 130 move the objective lens 132 in a radial direction 152 and a normal direction 150. Specifically, the optical pickup unit 130 moves the objective lens 132 normal to the optical surface 112 of the optical disc 110 to focus light between the optical surface 112 and the optical pickup unit 130. This focusing allows a sharp image of the optical transitions on the optical surface 112 to be focused onto the photodetector, which improves the operation of the optical disc drive 100. The optical pickup unit 130 moves the objective lens 132 radially relative to the optical surface 112 of the optical disc 110 to follow the tracks on the optical disc 110 as the optical disc 110 spins. This movement of the objective lens 132 is very fine because the objective lens 132 has to follow the tracks with a tolerance of approximately one micron in the radial direction 152 as the optical disc 110 spins. The objective lens 132 is generally mounted to the optical pickup unit 130 by the use of very delicate components. This delicate mounting is required in order for the objective lens 132 to move as precisely as is required to follow the tracks on the spinning optical disc 110 and to focus the optical transitions from the spinning optical disc 110 onto the photodetector.

As described above, the objective lens 132 has to move very precise distances in very short periods in order to follow the tracks on the optical surface 112. This makes the optical pickup unit 130 a relatively delicate device. The fragile nature of the optical pickup unit 130 makes it susceptible to failure due to relatively mild shock or vibration. One cause of failure is due to the objective lens 132 becoming dislodged from the structural components in the optical pickup unit 130 that secure the objective lens 132 to the optical pickup unit. Another cause of failure is due to the components that move the objective lens 132 becoming damaged. These problems are more prevalent in optical disc drives used in portable devices because these optical disc drives are typically subjected to greater and more frequent shock and vibration.

Additional problems occur in optical disc drives that have the objective lens 132 exposed to a user when an optical disc 110 is being exchanged from the motor 120. For example, a user may inadvertently touch the objective lens 132, which may damage the optical pickup unit 130 or contaminate the surface of the objective lens 132 with oils from the user's skin. In addition, during the exchange of the optical disc 110, the optical pickup unit 130 becomes exposed to the environment and may become damaged if contaminants from the environment enter it. An exposed optical pickup unit 130 may also be dangerous to the user if the optical pickup unit 130 becomes active in the presence of a user. Laser light is typically emitted by the optical pickup unit, which is a relatively bright and narrow beam of coherent light. This light may pose health risks to the user, such as causing irreversible and permanent damage to the user's retinas.

Therefore, a need exists for a mechanism incorporated into an optical disc drive that will secure the optical pickup unit in a fixed position and out of sight and reach of a user when the optical disc drive is not in use.

SUMMARY OF THE INVENTION

One embodiment of the present invention is directed toward the operation for an optical disc drive of the type including a moveably mounted optical pickup unit. The method may comprise providing a cover member attached within the optical disc drive, wherein the cover member is non-movable relative to the optical disc drive. The optical disc drive may be deactivated solely by moving the optical pickup unit to a position adjacent the cover member such that the optical pickup unit is protected by the cover member. The optical disc drive may be activated by moving the optical pickup unit away from the cover member.

DETAILED DESCRIPTION OF THE INVENTION

Figure 1:
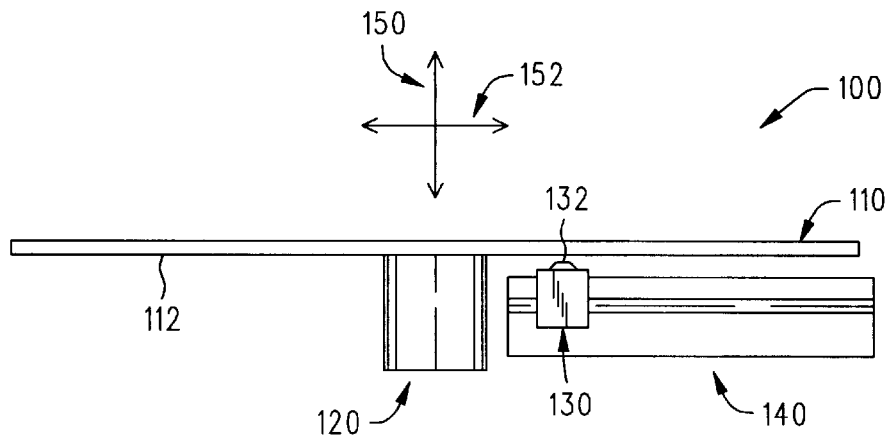
FIG. 1 is a schematic diagram of a side view of a prior optical disc drive.

FIGS. 2A through 5, in general, illustrate a method of operation for an optical disc drive 200 of the type including a movably mounted optical pickup unit 300 therein. The method comprises: providing a cover member 450, 490 in association with the optical disc drive 200; deactivating the optical disc drive 200 by moving the optical pickup unit 300 to a position adjacent the cover member 450, 490 such that the optical pickup unit 300 is protected by the cover member 450, 490; activating the optical disc drive 200 by moving the optical pickup unit 300 away from the cover member 450, 490.

FIGS. 2A through 5 also, in general, illustrate a method of protecting an objective lens 320 of an optical disc drive 200, wherein the objective lens 320 is movably mounted relative to the optical disc drive 200. The method comprises: providing a cover member 450, 490 in association with the optical disc drive 200; providing the objective lens 320 with a first operating position and a second operating position, wherein the objective lens 320 is in the first operating position when the objective lens 320 is located adjacent the cover member 450, 490, and wherein the objective lens 320 is in the second operating position when the objective lens 320 is not located adjacent the cover member 450, 490; causing the objective lens 320 to move from the second operating position to the first operating position.

FIGS. 2A through 5 also, in general, illustrate an optical disc drive 200 comprising: a rotation point 510; an optical pickup unit 300 moveable between a first position remote from the rotation point 510 and a second position closer to the rotation point 510, relative to the first position; a cover member 450, 490 located at the first position; wherein the optical disc drive 200 includes: a non-operative condition in which the optical pickup unit 300 is positioned at the first position adjacent the cover member 450, 490; and an operative condition in which the optical pickup unit 300 is positioned between the first position and the rotation point 510.

Figure 2A:
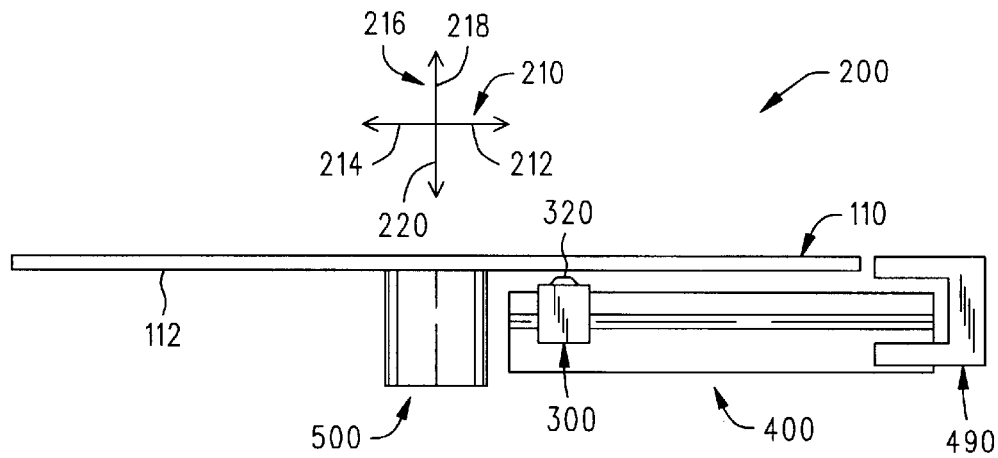
FIG. 2A is a schematic diagram of a side view of an optical disc drive in an operative condition.
Figure 2B:
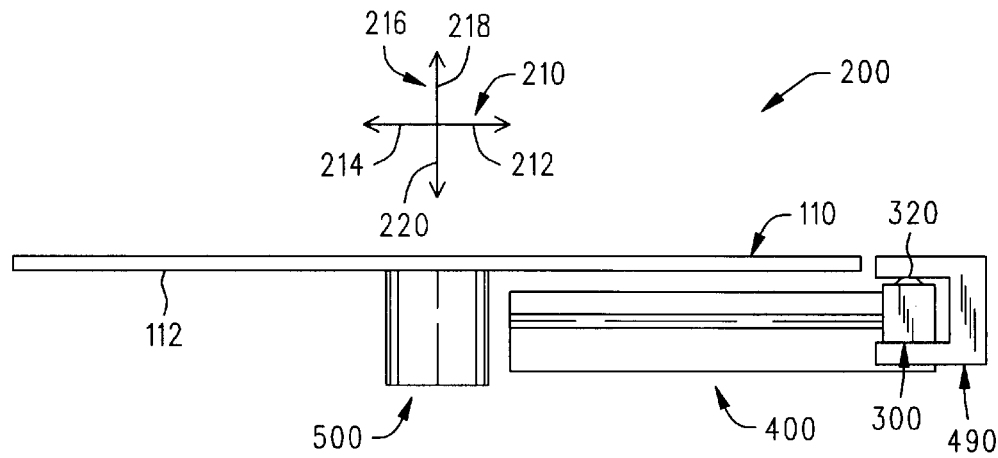
FIG. 2B is a schematic diagram of a side view of an optical disc drive in a non-operative condition.
Figure 3:
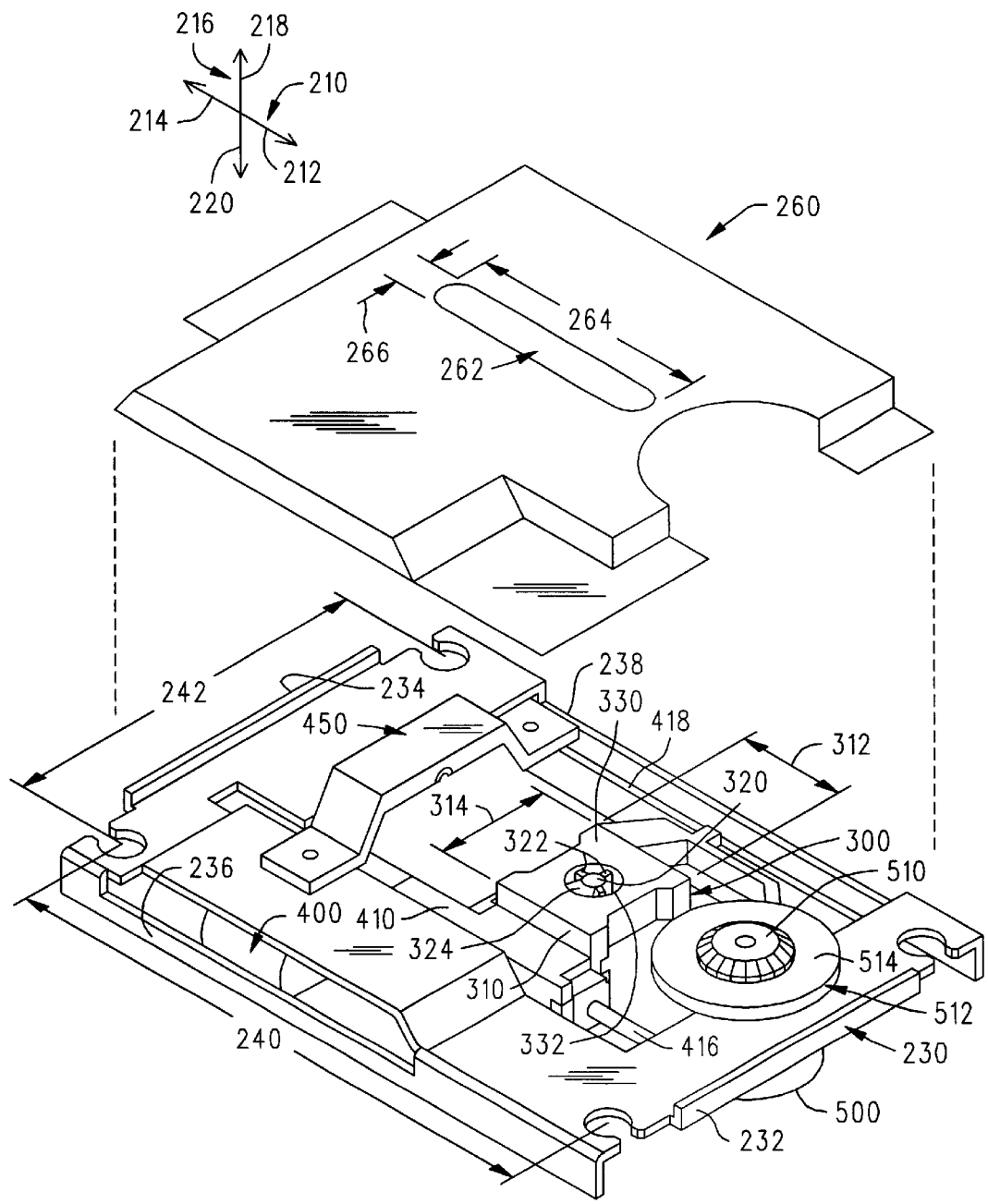
FIG. 3 is a side perspective view of an optical disc drive having a cover member attached thereto.
Figure 4:
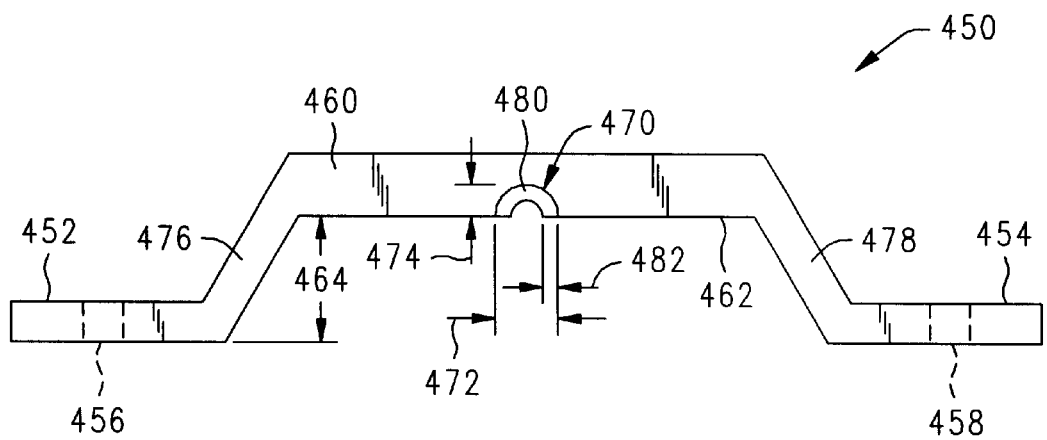
FIG. 4 is a side view of the cover member of FIG. 3 wherein the cover member has an indented portion.
Figure 5:
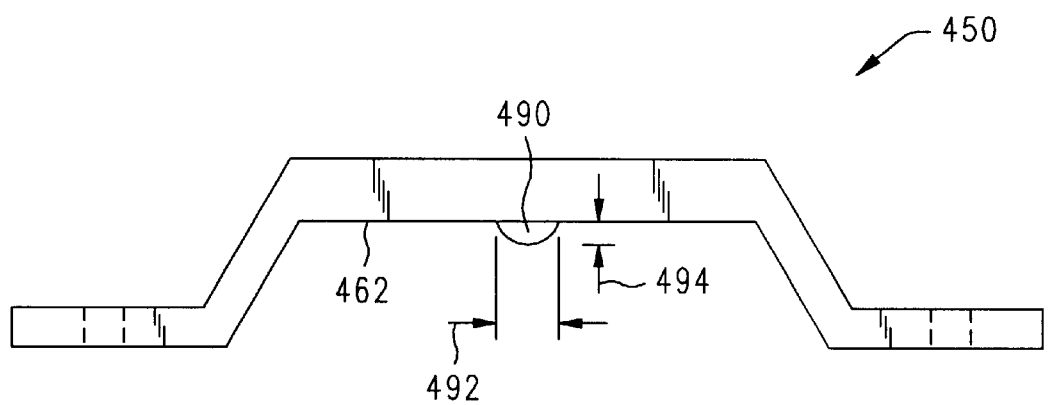
FIG. 5 is a side view of the cover member of FIG. 3 wherein the cover member has an extended portion.

Having described the optical disc drive 200 and the components thereof in general, they will now be described in greater detail. Referring to FIGS. 2A and 2B, in summary, the optical disc drive 200 may have an optical pickup unit 300 that is used to read data from an optical disc 100. The optical disc drive 200 may have a cover member 490 that may serve to protect the optical pickup unit 300 when it is not in use. Specifically, the optical disc drive 200 moves the optical pickup unit 300 between an operative position as illustrated in FIG. 2A and a non-operative position as illustrated in FIG. 2B. The non-operative position may be a position where the optical pickup unit 300 is covered by the cover member 490 when the optical pickup unit 300 is not in use. The cover member 490 illustrated in FIGS. 2A and 2B is one example of a cover member. Other examples of cover members are illustrated in FIGS. 3 through 5 and are depicted numerically as 450.

Having described the optical disc drive 200 and the components thereof in general, they will now be described in greater detail. A summary description of the optical disc drive 200 is followed by a more detailed description of the optical disc drive 200. Referring to FIGS. 2A, 2B, and 3, in summary, the optical disc drive 200 may have an optical pickup unit 300 that is used to read data from an optical disc 110. Specifically, the optical pickup unit 300 reads data stored in the form of optical transitions in narrow tracks located on an optical surface 112 of the optical disc 110 as the optical disc 110 spins. The optical pickup unit 300 may emit a narrow beam of light having a specific wavelength that is used to illuminate the optical surface 112. The light may, as an example, be emitted by a laser. The optical pickup unit 300 receives light reflected from the optical surface 112 and translates the reflected light to machine-readable image data, thus, the optical pickup unit 300 "reads" the data stored on the optical disc 110. The embodiment of the optical disc drive 200 shown in FIG. 2A is in an active or second operating condition when the optical pickup unit 300 is in a second operating position. The embodiment of the optical disc drive 200 shown in FIG. 2B is in an inactive or first operating condition when the optical pickup unit 300 is in a first operating position.

The optical pickup unit 300 may have an objective lens 320. The objective lens 320 may move in a normal direction 216 and a radial direction 210 relative to the optical pickup unit 300 as the optical pickup unit 300 is reading the data from the optical surface 112. The movement of the objective lens 320 in the normal direction 216 may serve to focus an image of the optical surface 112 onto optical components located in the optical pickup unit 300. The movement of the objective lens 320 in the radial direction 210 may serve to precisely follow the tracks on the optical surface 112 as the optical disc 110 spins. The objective lens 320 may only move distances in the order of microns relative to the optical pickup unit 300. Thus, the mechanisms within the optical pickup unit 300 that move the objective lens 320 tend to be very delicate, making the optical pickup unit 300 a relatively delicate device.

The light emitted by the optical pickup unit 300 may pose health risks to the user. For example, the light may damage the user's retinas, which generally causes permanent and irreversible damage to the user's vision. A user is exposed to the optical pickup unit 300 when he or she exchanges the optical disc 110, however, the optical pickup unit 300 is normally deactivated when an optical disc 110 is being exchanged. If, however, the optical pickup unit 300 becomes activated for any reason while the user is exposed to the optical pickup unit 300, the light may contact the user and endanger the health of the user.

As was previously described, a user may be exposed to the optical pickup unit 300 when he or she is exchanging an optical disc 110. If the user touches the objective lens 320 or causes an object to contact the objective lens 320, the optical pickup unit 300 may be damaged. For example, oils from the user's hands may contaminate the objective lens 320, thereby making the optical pickup unit 300 unable to read the optical surface 112 of the optical disc 110. In another example, the user may damage the mechanism that moves the objective lens 320 relative to the optical pickup unit 300, which will render the optical pickup unit 300 and, thus, the optical disc drive 200 inoperable. The optical disc drive 200 may also be rendered inoperable if the optical disc drive 200 is subject to excessive shock or vibration that damages the mechanism that moves the objective lens 320 relative to the optical pickup unit 300.

The optical disc drive 200 described herein overcomes the aforementioned problems by providing a cover member 450,490 that protects the optical pickup unit 300 from shock, vibration, and contamination. The cover member 450,490 also protects the user from dangerous light emitted by the optical pickup unit 300. The cover member 450,490 may be appropriately shaped so that the optical disc drive 200 may move the optical pickup unit 300 under the cover member 450,490 when the optical disc drive 200 is not in use. Locating the optical pickup unit 300 under the cover member 450,490 keeps the user from contacting the objective lens 320 and protects the user from being exposed to dangerous light should the optical pickup unit 300 become active. The cover member 450,490 may be appropriately shaped so that it secures the objective lens 320 in a fixed position when the optical pickup unit 300 is not in use. Securing the objective lens 320 lessens the likelihood that the optical pickup unit 300 will fail if it is subject to shock or vibration.

Having summarily described the optical disc drive 200 with the cover member 450, 490 incorporated therein, the optical disc drive 200 will now be described in greater detail including other components that are used by the optical disc drive 200. The following description describes the cover member 450, FIG. 3, followed by a brief description of the cover member 490, FIGS. 2A and 2B.

FIGS. 2A and 2B are simplified schematic illustrations depicting some of the components comprising the optical disc drive 200. The optical disc drive 200 may have a motor 500, the optical pickup unit 300, an optical mechanical assembly 400, and the cover member 450. Except for the addition of the cover member 450, the optical disc drive 200 may be similar to optical disc drives as are known in the art. The motor 500 may serve to spin the optical disc 110 at a predetermined rate. The rotation rate of the optical disc 110 typically varies between a few hundred rpm to several thousand rpm. As will be described below, the optical pickup unit 300 reads data from or writes data to the optical disc 110 as it spins.

FIG. 3 is a top perspective and more detailed view of the optical disc drive 200. The optical disc drive 200 of FIG. 3 illustrates a slightly different embodiment of a cover member 450 than was illustrated in FIGS. 2A and 2B. The differences in these embodiments will be described in detail below. For illustration purposes, the optical disc 110, FIG. 2, is not illustrated in FIG. 3. The motor 500, optical pickup unit 300, optical mechanical assembly 400, and cover member 490 may be mounted to a chassis 230. The chassis 230 may have a front side 232, a rear side 234, a left side 236, and a right side 238. The chassis 230 may have a length 240 extending between the front side 232 and the rear side 234. The chassis 230 may also have a width 242 extending between the left side 236 and the right side 238.

The optical pickup unit 300 may have a housing 310. The housing 310 may have a length 312, e.g., approximately two centimeters, and a width 314, e.g., approximately 1.5 centimeters. The housing 310 may have a top portion 330 (sometimes referred to herein as a surface) wherein the top portion 330 may have an opening 332. The optical pickup unit 300 may have an objective lens 320 movably mounted relative to the housing 310. The objective lens 320 may be situated in the proximity of the opening 332. A plurality of supports 322 may attach the objective lens 320 to a magnetic actuator 324 wherein the magnetic actuator 324 may serve to move the objective lens 320 relative to the housing 310 in a conventional manner. Specifically, the magnetic actuator 324 may serve to move the objective lens 320 in a radial direction 210 and a normal direction 216. The radial direction 210 is comprised of a positive radial direction 212 and a negative radial direction 214. The normal direction 216 is comprised of a positive normal direction 218 and a negative normal direction 220. As will be described in further detail below, the optical pickup unit 300 may serve to translate data stored on the optical disc to machine-readable data.

The magnetic actuator 324 may, as an example, move the objective lens 320 in the normal direction 216 a distance of 0.35 millimeters in either the positive normal direction 218 or the negative normal direction 220 to focus light between the optical disc and the optical pickup unit 300. The magnetic actuator 324 may also, as an example, move the objective lens 320 a distance of 0.25 millimeters in either the positive radial direction 212 or the negative radial direction 214 to follow the tracks on the optical disc as the optical disc spins.

The motor 500 may serve to spin an optical disc in a conventional manner. The motor may have a spindle 510 (sometimes referred to as a rotation point) and a hub 512. The spindle 510 may serve to center the optical disc on the hub 512. The hub 512 may have a hub surface 514 that may serve to support the optical disc on a plane as it spins. The motor 500 may serve to spin the spindle 510, the hub 512 and, thus, the optical disc, at various speeds, e.g., several hundred to several thousand rpm.

The optical mechanical assembly 400 may serve to move the optical pickup unit 300 in the radial direction 210 wherein the radial direction 210 is a direction that extends from the spindle 510. The optical mechanical assembly 400 typically does not have the precision for movement in the radial direction 210 as the magnetic actuator 324 does. Thus, the optical mechanical assembly 400 may serve to move the optical pickup unit 300 to an approximate location relative to an optical disc. The magnetic actuator 324 may then serve to move the objective lens 320 to a precise location relative to the optical disc.

The optical mechanical assembly 400 may operate in conjunction with a transport mechanism 410, a guide mechanism 416, and a slide mechanism 418. The transport mechanism 410 may serve as an interface between the optical pickup unit 300 and the optical mechanical assembly 400. The guide mechanism 416 and the slide mechanism 418 may be affixed to the chassis 230 and may support the optical pickup unit 300. The guide mechanism 416 and the slide mechanism 418 may be parallel and may also serve to guide the optical pickup unit 300 as it is moved by the optical mechanical assembly 400. The optical mechanical assembly 400 may, as an example, comprise a conventional servo system, not shown, to move the optical pickup unit 300.

The cover member 450 may be attached to the chassis 230 by conventional means, e.g., rivets, screws, or adhesives. Referring to FIG. 4, the cover member 450 may have a left support portion 452, a right support portion 454, a left elevation portion 476, a right elevation portion 478, and a top portion 460. The left support portion 452 and the right support portion 454 may have holes 456, 458 respectively. The holes 456, 458 may serve to attach the left support portion 452 and the right support portion 454 to the chassis 230, FIG. 3, in a conventional manner, i.e., screws may pass through the holes 456, 458 and the chassis 230. The left elevation portion 476 and the right elevation portion 478 may serve to elevate the top portion 460 from the left support portion 452 and the right support portion 454. The top portion 460 may have a lower side 462 that is separated from the left support portion 452 and the right support portion 454 by a distance 464. As will be described below, the lower side 462 may serve to support the optical pickup unit 300, FIG. 3, when the optical pickup unit 300 is not in use.

The lower side 462 may have a recess 470 located therein. The recess may have a width 472 and a depth 474. The recess 470 may be lined with a cushion or elastic material 480 having a thickness 482. The recess 470 may serve to secure the objective lens 320, FIG. 3, in a fixed location when the optical disc drive 200 is inactive. The cushion material 480 may serve to protect the objective lens 320, FIG. 3, from being scratched or contaminated when it is held in the fixed location by the recess 470.

Referring again to FIG. 3, the optical disc drive 200 may place the optical pickup unit 300 in two different operating positions. The first operating position of the optical pickup unit 300 is where it is positioned under or adjacent the cover member 450. In this position, the optical pickup unit 300 and, thus, the optical disc drive 200 are inactive as the optical pickup unit 300 is not able to read data from the optical disc. The second operating position of the optical pickup unit 300 is where it is not positioned adjacent or under the cover member 450. In this position, the optical pickup unit 300 and, thus, the optical disc drive 200 are active as the optical pickup unit 300 may read data stored on the optical disc.

Having described the optical disc drive 200 and the components thereof, the operation of the optical disc drive 200 will now be described.

Referring to FIG. 3, when the optical disc drive 200 is in use, an optical disc is located on the hub surface 514 and centered about the spindle 510. The motor 500 spins the optical disc at a predetermined speed, which may vary from several hundred rpm to several thousand rpm. The optical mechanical assembly 400 moves the optical pickup unit 300 in the positive radial direction 212 from the first operating position to the second operating position where it may read data from the optical disc.

The optical disc drive 200 receives instructions to read data from a specific portion of the optical disc. In order to read the data, the optical mechanical assembly 400 determines the present position of the optical pickup unit 300 and calculates how far in either the positive radial direction 212 or the negative radial direction 214 the optical pickup unit 300 must move in order to read the specified data. The optical mechanical assembly 400 in conjunction with the transport mechanism 410 then moves the optical pickup unit 300 on the guide mechanism 416 and the slide mechanism 418 to the position where the optical pickup unit 300 may read the data on the optical disc. The guide mechanism 416 may, as an example, pass through the transport mechanism 410 so as to assure that the transport mechanism 410 moves on an axis defined by the guide mechanism 416. The slide mechanism 418 may serve as support for the optical pickup unit 300 to assure that the optical pickup unit 300 does not tilt relative to the chassis 230.

When the optical pickup unit 300 is located in the approximate position of the data on the optical disc, the optical pickup unit 300 commences to read data located on the optical disc. The optical pickup unit 300 emits light through the objective lens 320 to illuminate a specific track on the optical disc. Light is reflected from the track, through the objective lens 320 and to a photodetector, not shown, in the optical pickup unit 300 that converts the reflected light to machine-readable data, e.g., digital data. A laser is typically used to generate the light used to illuminate the tracks on the optical disc. The laser may, as an example, emit light having a wavelength of approximately 790 nanometers and a power of approximately 70 milliwatts. The tracks on the optical disc have different reflective areas, sometimes referred to herein as pits and lands. Light reflected from the pits has a different intensity than light reflected from the lands. Binary data may be stored in the tracks on the optical disc by the use of the pits and the lands wherein the pits may represent binary zeros and the lands may represent binary ones. Accordingly, light reflected from a track on the optical disc changes between a high intensity and a low intensity as the optical disc spins. These changes in the intensity of the reflected light are, thus, representative of the data stored on the optical disc.

The optical mechanical assembly 400 does not have the precision to guide the objective lens 320 to follow a specific track on the optical disc as the optical disc spins. In order to solve this problem, the optical pickup unit 300 moves the objective lens 320 to the precise track from where the requested data is stored as the optical disc spins. Specifically, the magnetic actuator 324 moves the objective lens 320 in the positive normal direction 218 or the negative normal direction 220 to focus an image of the track onto the above-described photodetector located in the optical pickup unit 300. The magnetic actuator 324 also moves the objective lens 320 in the positive radial direction 212 or the negative radial direction 214 to follow a specific track as the optical disc spins. The objective lens 320 must constantly move in the radial direction 214 in order to follow the track because the track spirals around the optical disc and will be in constant radial movement relative to the objective lens 320. The radial movement of the objective lens 320 is very precise as the tracks are separated by a radial difference of approximately 1.6 microns and the optical disc spins at speeds of a few hundred to several thousand rpm.

When the optical disc drive 200 is not reading the optical disc, an instruction is transmitted to the optical mechanical assembly 400 to move the optical pickup unit 300 to the first operating positions. The optical mechanical assembly 400 moves the optical pickup unit 300 in the negative radial direction 214 far enough so that the objective lens 320 moves under the cover member 450. Referring to FIGS. 3 and 4, the objective lens 320 slides into the recess 470 where it is secured in a fixed position by the cushion material 480. Locating the objective lens 320 under the cover member 450 serves to secure the objective lens 320 in a fixed position, which lessens the likelihood of damage to the optical pickup unit 300 when the optical disc drive 200 is subjected to vibration or shock. This location also serves to protect the optical pickup unit 300 from being contacted by a user. For example, a user is less likely to be able to touch the optical pickup unit 300 or inadvertently contact the optical pickup unit 300 with an optical disc, either of which could damage the optical pickup unit 300. Locating the objective lens 320 under the cover member 450 also serves to shield a user from the light emitted by the optical pickup unit 300 should the light source, not shown, located in the optical pickup unit 300 become active.

Referring to FIGS. 2A, 2B, and 3, the cover member 450, 490 may be located in the radial direction 210 beyond the optical disc 110. Accordingly, the optical mechanical assembly 400 may have to be adapted to increase the movement of the optical pickup unit 300 beyond that of conventional optical disc drives so that the optical pickup unit is able to be located under the cover member 450, 490.

In one embodiment of the optical disc drive 200, the surface 330 of the optical pickup unit 300 contacts the lower side 462 of the cover member 450 when the optical pickup unit 300 is located under the cover member 450. Contacting the surface 330 with the lower side 462 further serves to protect the optical pickup unit 300 from damage as a result of shock or vibration by holding the optical pickup unit 300 in a fixed position. Contacting the surface 330 with the lower side 462 lessens the likelihood that the optical pickup unit 300 will become dislodged from the transport mechanism 410. It also lessens the likelihood that shock and vibration will cause the optical pickup unit 300 to damage components located in the optical mechanical assembly 400.

The optical pickup unit 300 has been described herein with the objective lens 320 extending in the positive normal direction 218 beyond the surface 330 of the optical pickup unit 300. In some optical pickup units, the objective lens 320 may be flush with the surface 330 or slightly recessed into the optical pickup unit 300. An optical disc drive using either of these optical pickup units 300 may use the cover member 450 illustrated in FIG. 5. The cover member 450 of FIG. 5 is identical to the cover member 450 of FIG. 4, except that it has a cushion material 490 extending from the surface 462 rather than having a recess 470, FIG. 4. The cushion material 490 may have a width 492 and may extend a distance 494 from the surface 462. The width 492 and the distance 494 are appropriately sized to allow the cushion material 490 to fit through the opening 332, FIG. 3, in the surface 330.

Referring to FIGS. 3 and 5, when the optical pickup unit 300 is moved under the cover member 450, the cushion material 490 passes through the opening 332 to contact the objective lens 320. The cushion material 490 secures the objective lens 320 in a fixed position, which as described above, lessens the likelihood that the objective lens 320 will be damaged if the optical disc drive is subjected to shock or vibration.

The optical disc drive 200 has been described using embodiments of the cover member 450 as illustrated in FIGS. 4 and 5. These cover members 450 contact the surface 330 of the optical pickup unit 300 and components located on the surface 330. The optical disc drive 200 illustrated in FIGS. 2A and 2B depicts another embodiment of a cover member 490. The cover member 490 is c-shaped, thus, the optical pickup unit 300 moves into the cover member 490 rather than under it. Accordingly, the cover member 490 encompass the optical pickup unit 300 and provides additional support.

Referring to FIGS. 2A, 2B, and 3, in another embodiment of an optical disc drive 200, the optical mechanical assembly 400 moves the objective lens 320 under the cover member 450, 490 every time a user exchanges an optical disc 110. For example, prior to powering itself down, the optical disc drive 200 may instruct the optical mechanical assembly 400 to move the objective lens 320 from the position shown in FIG. 2A to a position under the cover member 450, 490 as shown in FIG. 2B.

Some optical disc drives have an access door that must be opened in order for a user to gain access to the optical disc. In these applications, the optical disc drive may instruct the optical mechanical assembly 400 to move the objective lens 320 under the cover member 450, 490 when the user attempts to open the door. In some other optical disc drives the chassis 230 sides out from a housing when a user changes the optical disc, thus, exposing the objective lens 320 to the environment and the user. In these optical disc drives, the optical disc drive may instruct the optical mechanical assembly 400 to move the objective lens 320 under the cover member 450, 490 prior to sliding the chassis out of the housing.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method of operation for an optical disc drive of the type including a movably mounted optical pickup unit therein; said method comprising:

providing a cover member attached within said optical disc drive, said cover member being non-movable relative to said optical disc drive;

deactivating said optical disc drive solely by moving said optical pickup unit to a position adjacent said cover member such that said optical pickup unit is protected by said cover member; and activating said optical disc drive by moving said optical pickup unit away from said cover member.

2. The method of claim 1 wherein said activating includes supplying power to said optical pickup unit.

3. The method of claim 1 wherein said deactivating includes interrupting power to said optical pickup unit.

4. The method of claim 1 wherein said moving said optical pickup unit comprises moving said optical pickup unit along an axis.

5. The method of claim 4 wherein said axis extends radially from a rotation point within said optical disc drive.

6. The method of claim 1 wherein said deactivating further comprises contacting said optical pickup unit with said cover member.

7. The method of claim 1 wherein said optical pickup unit is of the type including an objective lens and wherein said deactivation includes moving said optical pickup unit to a position adjacent said cover member such that said objective lens is protected by said cover member.

8. A method of protecting an objective lens of an optical disc drive, wherein said objective lens is movably mounted relative to said optical disc drive; said method comprising:

providing a cover member attached within said optical disc drive, said cover member being non-movable relative to said optical disc drive;

providing said objective lens with a first operating position and a second operating position, wherein said objective lens is in said first operating position when said objective lens is located adjacent said cover member, and wherein said objective lens is in said second operating position when said objective lens is not located adjacent said cover member; and moving said objective lens from said second operating position to said first operating position, said moving causing said objective lens to be protected.

9. The method of claim 8 and further comprising contacting said objective lens with said cover member.

10. An optical disc drive comprising:

a rotation point;

an optical pickup unit moveable between a first position remote from said rotation point and a second position closer to said rotation point relative to said first position;

a non-movable cover member attached within said optical disc drive at said first position;

wherein said optical disc drive includes:
  a non-operative condition in which said optical pickup unit is positioned at said first position, adjacent said cover member; and
  an operative condition in which said optical pickup unit is positioned between said first position and said rotation point.

11. The optical disc drive of claim 10 wherein said non-operative condition is a condition in which said optical pickup unit is positioned at said first position so as to contact said cover member.

12. The optical disc drive of claim 10 wherein said optical pickup unit has a surface with an opening and wherein said optical pickup unit has a lens associated with said opening.

13. The optical disc drive of claim 12 wherein said non-operative condition is a condition in which said optical pickup unit is positioned at said first position so said surface contacts said cover member.

14. The optical disc drive of claim 13 wherein said non-operative condition is a condition in which said optical pickup unit is positioned at said first position so said lens contacts said cover member.

15. The optical disc drive of claim 12 wherein said cover member has a surface having an elastic material and wherein said non-operative condition is a condition in which said elastic material contacts said surface of said pickup unit.

16. The optical disc drive of claim 15 wherein said non-operative condition is a condition in which said elastic material contacts said lens.

* * * * *